INVENTOR
MAURICE A. MEYER

BY Joseph Weingarten
ATTORNEY

INVENTOR
MAURICE A. MEYER

BY Joseph Weingarten
ATTORNEY

SIGNAL MODULATING APPARATUS

Filed Sept. 11, 1956 3 Sheets-Sheet 3

*INVENTOR*
MAURICE A. MEYER

*BY* Joseph Weingarten
*ATTORNEY*

2,920,289

SIGNAL MODULATING APPARATUS

Maurice A. Meyer, Natick, Mass., assignor to Laboratory For Electronics, Inc., Boston, Mass., a corporation of Delaware Application September 11, 1956, Serial No. 609,145

13 Claims. (Cl. 332—16)

The present invention relates in general to signal modulating apparatus and in particular to the novel combination of a modulator and delay line.

This invention may, for example, be utilized to provide a plurality of output signals, each output signal being the input signal delayed by an integral multiple of the delay period of the delay lines, or it may be utilized for the generation of a wide band output signal of substantially constant amplitude whose frequency is a linear function of time. When used in the first mentioned manner, the effect of a tapped delay is obtained, when in the latter, the output signal facilitates the alignment of wide band filter networks. The invention will also be shown suited for other applications in the electrical art.

Tapped delay lines are well known in the prior art, one common type comprising a plurality of serially-connected inductors with a capacitor connected between the junction of each pair of inductors and a common terminal. An input signal is applied between the unconnected end of the first inductor and the common terminal. The input signal delayed is derived across each capacitor, the amount of delay being related to the number of inductors between the input inductor and the selected capacitor.

As a practical matter, when high delays are required, such a lumped parameter delay line requires a relatively large number of components. If a precise delay is required, each component must have a prescribed value maintainable within close tolerances. Furthermore, the value of most components is temperature dependent, adding to the difficulty of maintaining the desired precise delay.

Another form of tapped delay lines utilizes a plurality of cascaded sonic delay lines. Such an arrangement is bulky and of relatively high cost. Furthermore, sonic delay lines are also responsive to temperature changes. When precise delays are required, it is usually necessary to locate sonic delay lines in substantially constant temperature ovens. The oven required to accommodate a plurality of cascaded sonic delay lines would be large and require relatively large amounts of power to maintain the desired constant temperature.

Accordingly, it is a primary object of the present invention to provide a relatively compact, tapped delay line capable of providing substantially any selected precise delay interval which is an integral multiple of a relatively easily controlled base interval and incorporating a minimum number of precision components.

Another object of the invention is to attain the above object with standard components employed in the circuitry external to the base interval controlling means.

A further object of the invention is the provision of apparatus which responds to an input signal of varying frequency over a relatively narrow spectrum to provide an output signal whose frequency varies over a relatively wide spectrum.

Still another object is the provision of novel means for selecting the desired delay interval which utilizes the fixed frequency signals already present in the system for generating the desired delays.

Still a further object of the invention is the provision of circuit means which responds to input sinusoidal signals to provide a pulse train.

Broadly speaking, the invention comprises a closed loop having an adding network, delay line and modulator. In one form of the invention, the delay introduced by the delay line is substantially zero and the closed loop effectively comprises an adding network and a single sideband modulator. External input and modulating signals are applied to the adding network and modulator respectively.

The method of the invention includes the steps of additively combining an input signal and a signal related to a modulated signal, delaying the additively combined signals, modulating the delayed signal with a modulating signal to provide the said modulated signal, the latter including a sideband signal. Preferably a carrier signal is modulated with the delayed signal and the modulated carrier signal then modulated with the modulating signal to provide the said modulated signal by single sideband modulation.

For selecting output signals having a desired delay, the method includes the steps of mixing the delayed signal with selected combinations of the modulating and carrier signals to derive a mixer output signal for each selected combination, and selectively eliminating the high frequency components from the mixer output signal.

When the apparatus is utilized as a wide band sweep frequency generator, the input signal applied to the adding network is of frequency which continuously changes from a first to a second value separated by the frequency of the modulating signal during a selected time interval equal to the delay introduced by the delay means.

In a preferred form of the invention as a tapped delay line, an information signal, which it is desired to delay, modulates a signal of input frequency $f_o$ to provide an input signal. The input signal is cumulatively combined with a modulated signal to provide a combined signal for application to delay means which introduces a selected delay. Single sideband modulation is accomplished by modulating a carrier signal with the delayed output signal and then mixing the modulated carrier signal with a signal whose frequency is separated from that of the carrier signal by the frequency of a modulating signal, thereby providing the said modulated signal, which includes single sideband spectral components separated by integral multiples of the modulating signal frequency. The effect of this mode of operation is that the information signal, in the form of a modulating envelope, is recirculated through the loop which includes the delay means, advancing to a sideband frequency separated from the input frequency by an increasing integral multiple of the modulating signal frequency, upon each passage through the delay means. For example, if the delayed output signal includes spectral components $f_o$, $f_o+f_m$ and $f_o+2f_m$; after single sideband modulation, these spectral components are transposed to $f_o+f_m$, $f_o+2f_m$ and $f_o+3f_m$ respectively.

Thus the input frequency and each sideband thereof at the output of the delay means has the delayed information signal modulated thereon, the amount of delay being an integral multiple of said selected delay and related to the order of sideband, the higher the order, the larger the delay. By selectively coupling the signal of input frequency and each sideband signal to respective output terminals, there is provided the desired tapped delay line.

Other features, objects and advantages will be better understood from the following specification when read with reference to the accompanying drawing in which.

Figure 1:
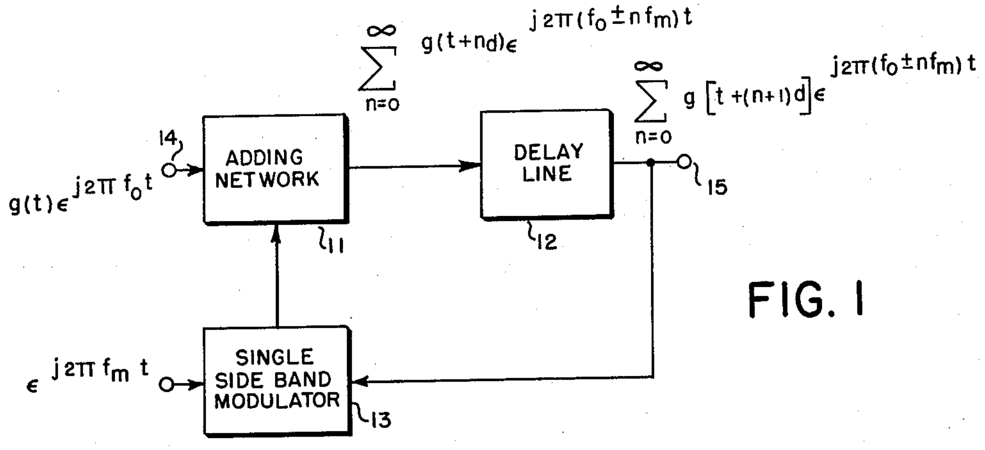
Fig. 1 is a block diagram of a basic embodiment of the invention together with a representation in complex notation of signals present at the indicated points.
Figure 3:
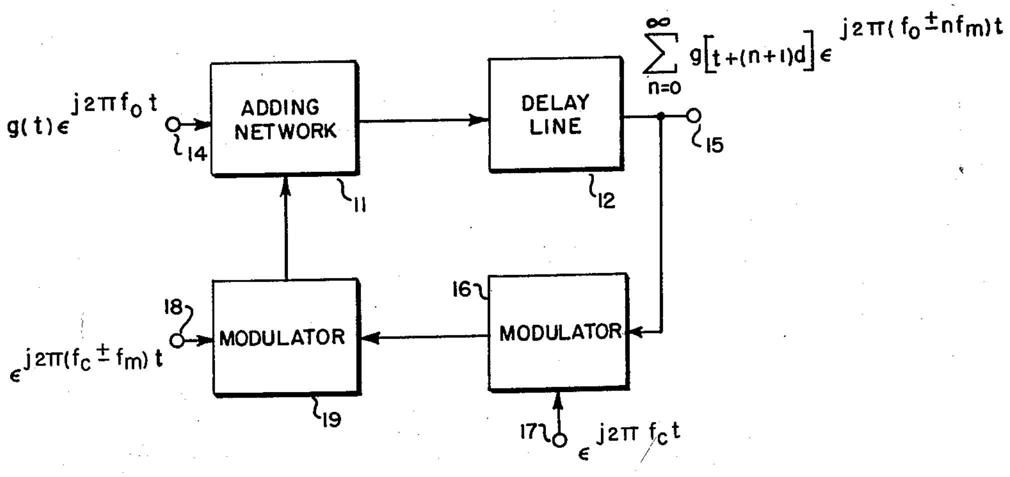
Fig. 3 is a block diagram of a preferred embodiment of the invention and a representation in complex notation of signals present at the indicated points.
Figure 6:
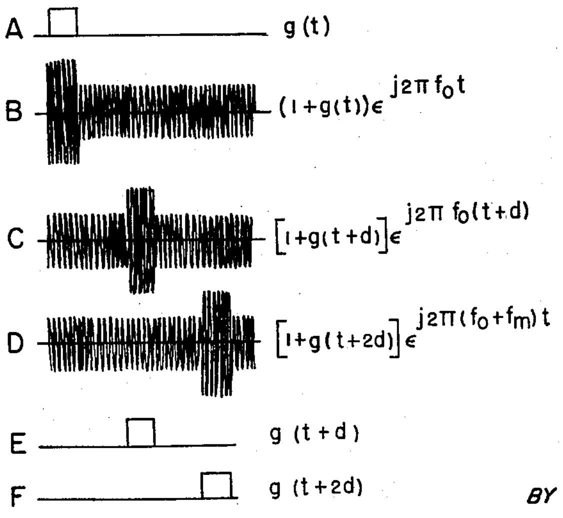
Figure 4:
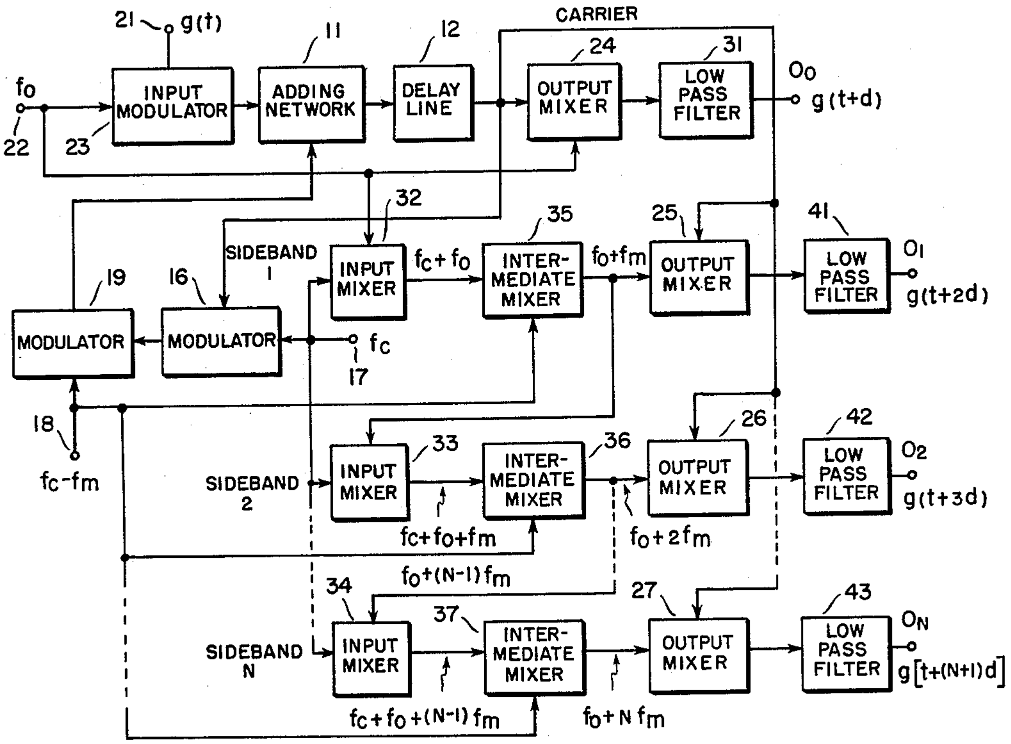
Fig. 4 is a block diagram of the embodiment of Fig. 3 and further includes the preferred means for coupling each sideband signal to its associated output terminal.

Fig. 6 is a graphical representation as a function of time of signal waveforms helpful in understanding the mode of operation of the systems illustrated in Figs. 1, 3 and 4; and Figs. 7A, 7B and 7C are three-dimensional representations of respectively input, delay line output, and single sideband modulator output signal amplitude and frequency as a function of time for the system of Fig. 1 when utilized as a sweep frequency generator.

With reference now to the drawing and more particularly Fig. 1 thereof, a basic embodiment of the invention is seen to comprise a closed loop which includes an adding network 11, delay line 12 and single sideband modulator 13. The information signal which it is desired to delay, designated $g(t)$, preferably modulates a signal of input frequency $f_o$ to derive an input signal for application to input terminal 14 of adding network 11 represented in complex notation as $$g(t)\,\epsilon^{j2\pi f_o t}$$

It will become evident from the discussion which follows that when the input signal is combined in adding network 11 with the output signal from modulator 13, the output signal from adding network 11 is represented in complex notation by the summation $$\sum_{n=0}^{n=\infty} g(t+nd)\,\epsilon^{j2\pi(f_o\pm nf_m)t}$$

Responsive to the application of the latter signal to delay line 12, there appears on output terminal 15 the output signal represented in complex notation by the summation $$\sum_{n=0}^{n=\infty} g(t+(n+1)d)\,\epsilon^{j2\pi(f_o\pm nf_m)t}$$

The latter signal is then applied as a carrier signal to modulator 13, also energized by a modulating signal represented in complex notation as $$\epsilon^{j2\pi f_m t}$$

to provide the modulated output signal which is applied to the other input of adding network 11.

The above discussion has described the system when steady state conditions have been reached and the bandwidth of the apparatus is infinite. In the signal representative expressions, the sign which separates $f_o$ and $f_m$ is respectively positive or negative when modulator 13 provides only the upper or lower sideband.

The mode of operation will be better understood from a consideration of the buildup to the steady state described in detail in connection with the mode of operation of the preferred embodiment of a tapped delay line according to the invention illustrated in Fig. 4. However, it is first convenient to describe examples of other forms which the invention may take.

Figure 2:
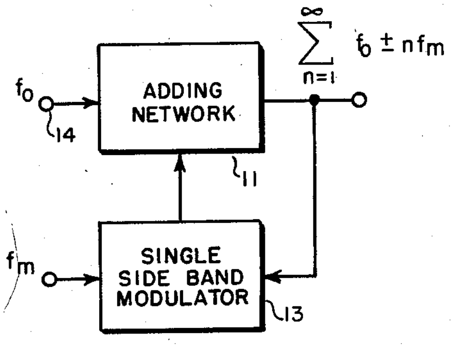
Fig. 2 is a block diagram of the invention where no delay is introduced between the adding network and modulator together with a representation of spectral components present at the indicated points.
Figure 5:
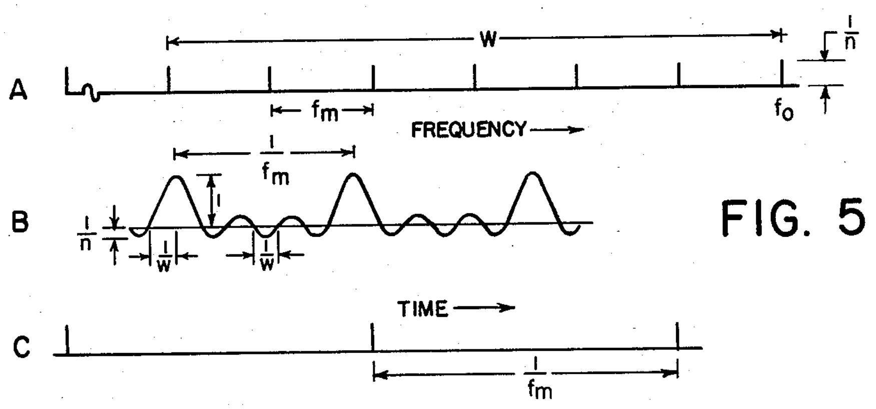
Fig. 5A is a graphical representation of the spectral components in the output signal from the system of Fig. 2.
Figs. 5B and 5C are graphical representations as a function of time of output signal waveforms attainable from the system of Fig. 2.

With reference to Fig. 2, there is illustrated the apparatus of Fig. 1 with delay line 12 removed. If an input signal of frequency $f_o$ is applied at terminal 14 to adding network 12, whose output is modulated in single sideband modulator 13 by a signal of frequency $f_m$, and the modulated output combined with the input signal, the spectral components at the adding network output are $f_o \pm nf_m$ where the sign separating $f_o$ and $nf_m$ is positive when modulator 13 provides the upper sideband output; negative, when a lower sideband output is provided. As a practical matter, circuit limitations prevent the attainment of an infinitely wide spectrum. A typical spectrum is illustrated in Fig. 5A of width $w$ centered about the input frequency $f_o$ wherein the spectral components are separated by the modulating frequency $f_m$. The number of line spectra is $$n=\frac{w}{f_m}$$

It is shown on page 514 of "The Mathematics of Circuit Analysis" by Dr. E. A. Guilleman that the time function which corresponds to the illustrated spectral distribution is $$f(t)=\frac{\sin n\pi f_m t}{n \sin \pi f_m t}\cdot\cos 2\pi f_o t$$

Such a signal waveform is graphically represented in Fig. 5B, the illustrated waveform representing the multiplier of $\cos 2\pi f_o t$. The utility of such a signal waveform generator will be better understood from a consideration of typical frequencies and bandwidths attainable with practical circuits. If $f_o=1$ mc.$=w$ and $f_m=1$ kc., then $n=1000$ and the output signal waveform is effectively a plurality of substantially 2 microsecond pulses whose repetition frequency is 1 kc., since constructive interference of the spectral components occurs at such rate and the amplitude of the variations between regions of constructive interference is but 1/1000 of the maximum amplitude in the latter regions. The graphical representation of such a signal waveform is illustrated in Fig. 5C. Note that this arrangement non-linearly combines a pair of sinusoidal signals, whose frequencies are relatively easy to control, to derive periodic narrow pulses. Other uses for the novel circuit arrangement of Fig. 2 will be suggested to those skilled in the art.

With reference now to Fig. 3, there is illustrated the system of Fig. 1 with the arrangement of modulators 16 and 19 comprising the preferred form of single sideband modulator 13. Modulator 13 is energized by the delay line 12 output signal and a carrier signal of frequency $f_c$, thereby effectively transposing the spectral components in the former signal about the carrier frequency $f_c$. To obtain single sideband modulation wherein spectral components are separated by $f_m$, modulator 19 is energized by the output signal from modulator 16 and a fixed frequency signal of frequency $f_c \pm f_m$, the sign being positive or negative when respectively lower or upper sideband components are desired in the modulated output.

The single sideband modulation effected by mixing the indicated signals in modulators 16 and 19 will be better understood from the following example. If the output of delay line 12 includes a signal of frequency $f_o$, then the output signal from modulator 16 includes spectral components $f_c \pm f_o$, $f_c$ normally being much higher than $f_o$. The component $f_c+f_o$ may be selected by filtering techniques well known in the art and applied to modulator 19.

When the latter signal is mixed with a signal of frequency $f_c-f_m$, a difference frequency of $f_o+f_m$ is provided in the modulator 19 output signal. The signal of this frequency is seen to be the upper sideband component which would be obtained by modulating the signal of frequency $f_o$ with a signal of frequency $f_m$. Moreover, since the sum frequency in the output from modulator 16 is much higher than the difference frequency, a conventional low pass filter selectively passes only the desired difference frequency signal.

Normally, the loop gain of the closed loop which includes adding network 11, delay line 12 and modulator 16 and 19 is selected to be unity. Accordingly, the gain characteristics of these system elements and any amplifiers which may be introduced into the loop are adjusted to provide a loop gain of substantially unity.

With reference now to Fig. 4, there is illustrated a block diagram of a preferred embodiment of the invention when utilized as a tapped delay line. Before describing in detail its mode of operation, its physical arrangement will be described. Reference numerals which identify corresponding elements in the previously described systems are carried over to Fig. 4. Where appropriate, signals, or their frequencies, are designated on respective signal lines.

An input modulator 23, energized by an input signal $g(t)$ and another signal of relatively high frequency $f_o$, provides a signal to adding network 11, arranged in a closed loop which includes delay line 12, modulator 16 and modulator 19 arranged in the same manner as the sustem of Fig. 3. The output signal from delay line 12, in addition to being recirculated about the closed loop, is applied to mixers 24, 25, 26 and 27 associated with the Carrier, Sideband 1, Sideband 2, and Sideband N channels respectively. Mixer 24 in the Carrier channel is also energized by the signal of frequency $f_o$ on terminal 22 which energizes input modulator 23. The output signal from mixer 24 is coupled to low pass filter 31 to provide on output terminal $O_0$ of the Carrier channel, the delayed input signal, $g(t+d)$, $d$ being the time delay imparted by delay line 12 to an input signal.

Each of the sideband channels includes three cascaded mixers which energize a low pass filter. The input mixers 32, 33 and 34 in Sideband 1, Sideband 2 and Sideband N channels respectively are each energized jointly by the signal of carrier frequency $f_c$ at terminal 17 and respectively by the input signals applied to the final mixers of the preceding channel, respectively mixers 24, 25 and 26. The intermediate mixers in each sideband channel, respectively 35, 36 and 37 are energized jointly by the modulating signal on terminal 18 of frequency $f_c-f_m$ and separately by the output signals of frequency indicated on the respective output signal lines from input mixers 32, 33 and 34. The output signal from each intermediate mixer is applied to the second input of the associated final mixer and the output signals from the final mixers 25, 26 and 27 are respectively applied to low pass filters 41, 42 and 43 to provide the delayed input signals, $g(t+2d)$, $g(t+3d)$, . . ., $g(t+(N+1)d)$ respectively on output terminals $O_1$, $O_2$ . . . $O_N$.

Reference to the signal waveforms graphically represented as a function of time in Fig. 6 will facilitate understanding the mode of operation of the apparatus of Fig. 4. The input signal $g(t)$, represented as a rectangular pulse in Fig. 6A by way of example, only is applied to terminal 21 of modulator 23 to modulate the input signal of frequency $f_o$ and yield the output signal $$(1+g(t))\,\epsilon^{j2\pi f_o t}$$

illustrated in Fig. 6B. This signal results when modulator 23 is a conventional unbalanced modulator. When modulator 23 is a balanced modulator, the signal applied to adding network 11 is that indicated as present on terminal 14 in Figs. 1 and 3

$$g(t)\,\epsilon^{j2\pi f_o t}$$

In the present discussion, it is convenient to assume that initially there is no output signal from modulator 19; hence, the only output signal from adding network 11 is then the signal from modulator 23. For the purposes of this discussion, it is assumed that adding network 11 has no attenuation; however, it is to be understood that attenuation or gain may be introduced by the network without departing from the inventive concepts. Assuming no attenuation, the signal of Fig. 6B is applied to delay line 12 which imparts a time delay of $d$ to the input signal to provide the input signal delayed $$(1+g(t+d))\,\epsilon^{j2\pi f_o(t+d)}$$

illustrated in Fig. 6C. The output signal from delay line 12 is then utilized to modulate a relatively high frequency carrier signal on terminal 17 of frequency $f_c$ in modulator 16 to transpose the frequency spectrum of the output signal from delay line 12 to a convenient frequency when it is desired to amplify and/or filter this spectrum as indicated above. No filters or amplifiers are illustrated in Fig. 4; however, those skilled in the art may insert filters and amplifiers into the loop without departing from the inventive concepts.

Modulator 19, energized by a modulating signal of frequency $f_c-f_m$, is effective in translating the frequency spectrum coupled from modulator 16 displaced lower by an increment $f_m$ from its original position in the delay line 12 output signal. Considering the signal illustrated in Fig. 6C of frequency $f_o$ as the modulating signal to modulator 16, there results a sum frequency from the modulation process of frequency $f_c+f_o$ which when mixed with the signal applied at terminal 18 of frequency $f_c-f_m$ in single sideband modulator 13, includes a difference frequency signal of frequency $f_o+f_m$ which is applied to adding network 11. At this time, $g(t)$ is zero and the signal from modulator 23 is the unmodulated carrier signal of frequency $f_o$. The signal from modulator 19 is essentially that illustrated in Fig. 6C with the exception that the carrier signal is now of frequency $f_o+f_m$. At this time the output of adding network 11 then includes the last-mentioned signal plus the unmodulated carrier signal of frequency $f_o$. This output signal is again applied to delay line 12 to provide an output which includes the delayed unmodulated carrier signal of frequency $f_o$ and the delayed modulated signal of frequency $f_o+f_m$ illustrated in Fig. 6D. A comparison of the delay line 12 output signal waveforms illustrated in Figs. 6C and 6D reveals two significant differences therebetween. First, it is seen that the modulated portion of the waveform of Fig. 6C is delayed by a time interval $d$, while that of Fig. 6D is delayed by $2d$. Second, the frequency of the former waveform is $f_o$, while that of the latter is $f_o+f_m$. Thus, by selectively filtering the output signal of delay line 12 modulated signals may be derived having modulated portions separated in time by integral multiples of the delay imparted by delay line 12. Demodulation of the signals of Figs. 6C and 6D yields respectively the signals of Figs. 6E and 6F, which are the input signal of Fig. 6A delayed by $d$ and $2d$ respectively.

In the same manner that the modulated carrier of frequency $f_o$ from delay line 12 is fed back to the delay line input through modulators 16 and 19 and adding network 11 whereby its frequency is stepped up by $f_m$, the modulated carrier of frequency $f_o+f_m$ initiates a signal having a like modulation envelope but of frequency $f_o+2f_m$. In general, modulators 16 and 19 are effective in imparting stepwise changes to the frequency of delay line 12 output signal in increments of $f_m$, thereby yielding the steady state output signal indicated on output terminal 15 in Figs. 1 and 3. By utilizing conventional filtering techniques, or preferably the method described below, which utilizes the apparatus illustrated in Fig. 4 to separate the sidebands, an input signal delayed by substantially any desired integral multiple of the delay period $d$ may readily be obtained.

Before discussing the novel filtering system, some salient features of the portion of the system just described will be considered. Relatively long delays may be readily obtained to a high degree of precision with but a single compact delay line which normally imparts a fraction of the desired delay. The compactness of the delay line facilitates temperature control thereof, thereby maintaining the desired delay to within close tolerances. The apparatus is operative with many different types of delay means, lumped parameter delay lines, liquid sonic delay lines and solid sonic delay lines being examples of the form delay line 12 may take.

While the bandwidth of the spectrum available at the output of delay line 12 is theoretically infinite, certain physical limitations restrict this somewhat. Usually the delay line bandwidth is the limiting factor. If the delay line has a bandwidth of $w$, $f_o$ is preferably chosen to be the lowest frequency within the delay line pass band when an upward stepping single sideband modulator 13 is utilized as in the example described above. If the latter modulator effects a downward stepping of frequency, then $f_o$ is preferably chosen to be the highest frequency within the pass band of the delay line. With a bandwidth of w and a modulating frequency of $f_m$, the number of available sidebands N is $w/f_m$. Including the delay available from the modulated carrier signal of frequency $f_o$, the number of delay increments available is then $N+1$.

The preferred method of obtaining these increments will now be described. The delayed signal available on the carrier signal of frequency $f_o$ is obtained by applying the output signal of delay line 12 to mixer 24 together with the signal of frequency $f_o$, available at terminal 22, and applying the output signal of mixer 24 to low pass filter 31. The latter filter rejects all transposed spectral components in the delay line 12 output signal except those closely spaced about the frequency $f_o$ to yield the delayed signal $g(t+d)$ on terminal $O_o$ illustrated in Fig. 6E.

Each of the output mixers 25, 26 and 27 together with their associated low pass filters 41, 42 and 43 respectively function in the same manner as output mixer 24 in cooperation with low pass filter 31. Each output mixer is energized by the delay line 12 output signal and a signal whose frequency equals that of the selected sideband frequency in order to translate the frequency spectrum of the delay line 12 output signal to a position which enables each low pass filter to select the desired components. The input and intermediate mixers co-act to provide the desired frequencies by combining signals already present in the system.

Each input mixer is energized by a signal of frequency $f_c$ available at terminal 17. The other input to each input mixer is energized by the fixed frequency signal applied to the output mixer of the preceding channel. Thus, input mixers 32, 33 and 34 are energized by signals of frequency $f_o$, $f_o+f_m$ and $f_o+(N-1)f_m$ respectively to provide output signals of sum frequency $f_c+f_o$, $f_c+f_o+f_m$ and $f_c+f_o+(N-1)f_m$ respectively. These output signals are respectively applied to intermediate mixers 35, 36 and 37 which are energized jointly by the modulating signal of frequency $f_c-f_m$ available at terminal 18 to provide respective output difference frequency signals corresponding to the associated sideband frequencies of $f_o+f_m$, $f_o+2f_m$, $f_o+Nf_m$, desired for application to the respective output mixers 25, 26 and 27 as indicated above.

The above filtering method effectively provides a filter having a plurality of closely-spaced pass bands each of a relatively high Q, thereby enabling the sidebands to be closely-spaced and the delay line bandwidth most efficiently used. For example, consider a delay line with a bandwidth of 2 mc. centered about 10 mc., and a frequency separation of 20 kc. between sidebands. To select the desired sidebands, the low pass filters need a pass band which extends from 0 to slightly less than 10 kc. This effectively results in the passage of spectral components within 10 kc. of the selected sideband, or over a bandwidth of slightly less than 20 kc. At 10 mc., this performs as well as a conventional tuned filter having a $$Q \text{ of } \frac{f_o}{w} \text{ which is } \frac{10^7}{2.10^4}, \text{ or } 500$$

Turning now to another application of the invention, the use of the embodiment of Fig. 1 as a sweep frequency generator will be described. A sweep frequency generator which provides a constant amplitude signal output whose frequency is a linear function of time is useful in the alignment of frequency sensitive networks, such as the intermediate frequency and video amplifiers of television and radar sets.

Figure 7:
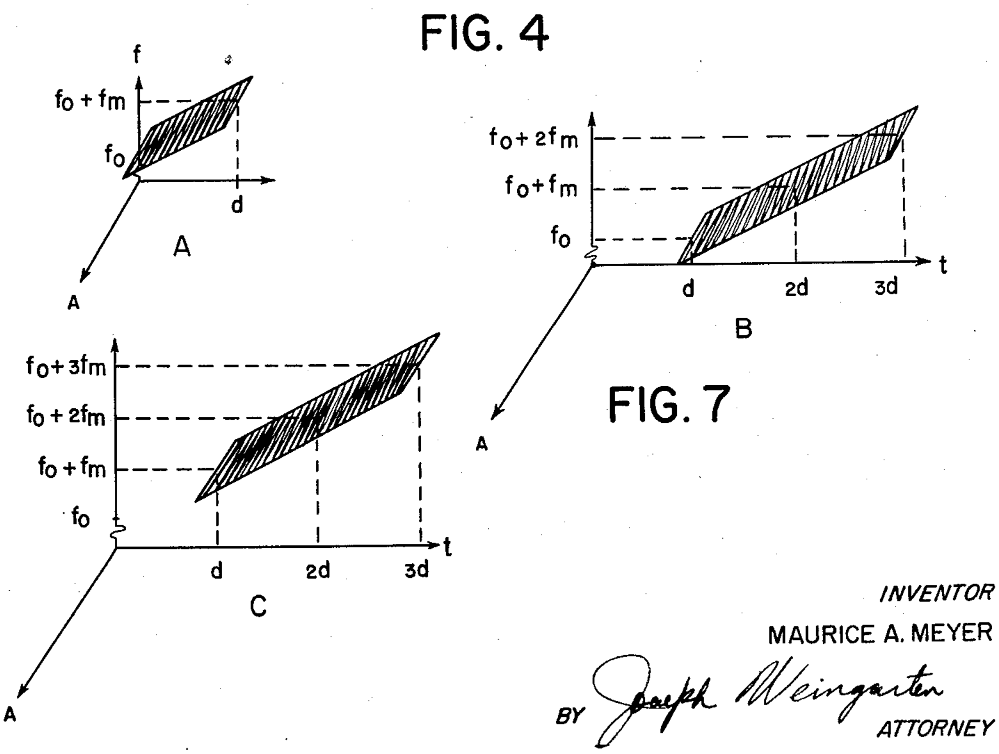

Such use will be better understood from the three-dimensional representation of the functional relation between the frequency and amplitude of designated signals and time illustrated in Fig. 7, where time is represented along the $t$ axis, frequency along the $f$ axis, and amplitude along the A axis. With reference to Fig. 7A, the amplitude and frequency of an input signal is represented as a function of time. The signal is seen to have a frequency which is a linear function of time, varying from $f_o$ to $f_o+f_m$ and being of substantially constant peak-to-peak amplitude for its duration which lasts from $t=0$ to $t=d$. This signal is applied to terminal 14 of adding network 11 and may be derived from a conventional sweep frequency generator. Since during this time interval there is no signal from single sideband modulator 13, the output of adding network 11 is the signal of Fig. 7A. This is applied to delay line 12 which responds with the delayed signal represented in Fig. 7B in the time interval $d$ to $2d$. The output of delay line 12 is then applied to single sideband modulator 13 which is also energized by the modulating signal of frequency $f_m$. Thus, the frequency of the delayed signal is stepped upward by $f_m$ to provide the output signal represented in Fig. 7C and having a frequency which varies from $f_o+f_m$ to $f_o+f_m$ during the interval $d$ to $2d$. This signal is applied to adding network 11, and since the input signal of Fig. 7A becomes zero at time $d$, the signal of Fig. 7C is the output signal from adding network 11 which is applied to delay line 12. The output of delay line 12 during the interval $2d$ to $3d$ is then the signal of Fig. 7C delayed by $d$ to yield the output signal of Fig. 7B during the interval $2d$ to $3d$ having a frequency which varies linearly from $f_o+f_m$ to $f_o+2f_m$ and is applied to single sideband modulator 13. Like the signal applied during the interval $d$ to $2d$, the frequency of this signal is stepped up by $f_m$ to provide the modulator output signal of Fig. 7C, linearly varying in frequency from $f_o+2f_m$ to $f_o+3f_m$. This signal is applied to delay line 12 through adding network 11 in a like manner, the sequence described above repeating until the frequency of the input signal to delay line 12 becomes higher than the highest frequency of the delay line pass band. At this time, there is no signal output from delay line 12. The sequence may then be initiated by applying another input signal as represented in Fig. 7A.

Utilization of the novel apparatus in the manner described above converts a relatively narrow band signal of varying frequency whose amplitude and linearity may be controlled relatively easily into an output signal whose frequency varies between relatively wide limits and has a linearity and amplitude corresponding to that of the input signal. If the input signal is of constant frequency instead of linearly increasing, the output signal changes frequency stepwise by increments of $f_m$.

The apparatus is especially useful for generating video sweep signals; that is, signals whose frequency varies between substantially zero frequency and a frequency of the order of 10 mc. A conventional method of generating such signals in the prior art involved mixing a conventional high frequency signal of varying frequency with a fixed frequency signal corresponding to either the upper or lower frequency in the swept band, and selecting the difference frequency signal generated during the mixing process. When the apparatus is employed in the above manner with a delay line having a bandwidth which extends from 0–10 mc., it is only necessary to utilize an input signal whose frequency varies from 10 inc. to a value which is $f_m$ less after the time interval $d$, and a single sideband modulator 13 which steps the frequency of input signals thereto except those of zero frequency downward in increments of $f_m$.

The uses and specific embodiments of the invention have been described by way of example only. Other uses of, modifications of and departures from the specific apparatus described herein will be apparent to those skilled in the art within the inventive concepts. Consequently, the invention is to be construed as limited only by the spirit and scope of the appended claims.

What is claimed is:

1. Electrical apparatus comprising, a closed loop for circulating an electrical signal having spectral components, and means for imparting stepwise frequency increments of the same magnitude and in only the same direction to each of said spectral components during each circulation through said loop.

2. The apparatus of claim 1, wherein said closed loop includes an adding network and delay means.

3. Electrical apparatus comprising an adding network which provides an output signal, means for recirculating said output signal through said network, and means for imparting stepwise frequency increments of the same magnitude and in only the same direction to each spectral component of said output signal prior to each entry into said adding network.

4. Electrical apparatus comprising delay means for imparting a selected time delay to an input signal, means for recirculating the delayed input signal through said delay means, and means for imparting stepwise frequency increments of the same magnitude and in only the same direction to each spectral component of said delayed input signal prior to each reentry into said delay means.

5. Electrical apparatus comprising a single sideband modulator coupled to an adding network which network cumulatively combines the modulated output signal derived from said modulator with an input signal to generate an output signal.

6. Electrical apparatus comprising, sources of input and modulating signals, an adding network for cumulatively combining the signals on first and second inputs to provide a combined signal at its output, means for coupling said first input to said input signal source, and means, including a single sideband modulator to which said modulating signal source is coupled, for coupling said output to said second input.

7. Electrical apparatus arranged in a closed loop which includes delay means interposed between an adding network and single sideband modulator, and means for energizing said adding network and modulator with externally derived input and modulating signals respectively.

8. Electrical apparatus arranged in a closed loop which includes delay means interposed between an adding network and a single sideband modulator, means for energizing said adding network and modulator with externally derived input and modulating signals respectively, and frequency selective apparatus energized by the output signal of said delay line.

9. Electrical apparatus comprising, an adding network which provides an output signal, delay means for imparting a selected delay to the adding network output signal, a source of a signal of carrier frequency, means for modulating said signal of carrier frequency with the delayed adding network output signal to provide the delayed output signal with its spectral components transposed about said carrier frequency, a source of a modulating signal whose frequency differs from said carriers frequency by a selected increment, means for mixing said delayed output signal having transposed spectral components with said modulating signal to provide a difference frequency signal which is said delayed output signal with spectral components uniformly displaced in frequency in the same direction by said selected increment, and means for applying said difference frequency signal to said adding network.

10. Electrical apparatus arranged in a closed loop which includes delay means interposed between an adding network and a single sideband modulator, means for energizing said adding network and modulator with externally derived input and modulating signals respectively, thereby providing a plurality of signals at the output of said delay line separated in frequency from the input signal frequency by integral multiples of the modulating signal, a plurality of output terminals, and frequency selective apparatus for selectively coupling a delay line output signal to an associated output terminal.

11. A wide band sweep frequency generator comprising, a source of an input signal whose frequency continuously changes from a first to a second value in a selected time interval, delay means which is energized by said input signal during and which imparts a delay substantially equal to said selected time interval, means for modulating the output signal of said delay line with a modulating signal to provide a selected single sideband signal, and means for applying the latter signal to the input of said delay line.

12. Apparatus for delaying an input signal comprising, a source of a signal of input frequency, means for modulating said signal of input frequency with said input signal to provide an adding network input signal, an adding network which provides an output signal, delay means for imparting a selected delay to the adding network output signal, a source of a signal of carrier frequency, means for modulating said signal of carrier frequency with the delayed adding network output signal to provide the delayed output signal transposed with its spectral components about said carrier frequency, a source of a modulating signal whose frequency differs from said carrier frequency by a selected increment, means for mixing said delayed output signal having transposed spectral components with said modulating signal to provide a difference frequency signal which is said delayed output signal with spectral components uniformly displaced in frequency in the same direction by said selected increment, means for applying said difference frequency signal to said adding network whereby the latter signal is cumulatively combined with said adding network input signal to provide said output signal, a carrier output mixer energized by said delayed output signal and said input frequency, a carrier channel low pass filter energized by the latter mixer and providing at its output said input signal delayed by said selected delay, and a plurality of sideband channels, each sideband channel comprising, an input mixer which provides a sum frequency signal when energized by said carrier frequency signal and the fixed frequency signal which energizes the output mixer associated with the channel corresponding to the next lower order sideband, an intermediate mixer energized by said modulating signal and said sum frequency signal to provide a channel difference frequency signal, an output mixer energized by said delayed output signal and said channel difference frequency signal, and a low pass filter energized by the output signal from said output mixer and providing said input signal delayed by an integral multiple of said selected delay.

13. Modulating apparatus comprising, a source of a signal of carrier frequency, means for modulating said signal of carrier frequency to provide an output signal with spectral components transposed about said carrier frequency, a source of a modulating signal having a frequency different from said carrier frequency by a selected increment, and means for mixing said output signal having transposed spectral components with said modulating signal to provide a difference frequency signal with said transposed spectral components further transposed but within a single sideband relative to the transposed spectral component of said carrier frequency in said difference frequency signal.

References Cited in the file of this patent

UNITED STATES PATENTS

| | | |
|---|---|---|
| 2,358,152 | Earp | Sept. 12, 1944 |
| 2,638,572 | Goubau | May 12, 1953 |
| 2,660,618 | Aigrain | Nov. 24, 1953 |
| 2,672,589 | McLeod | Mar. 16, 1954 |
| 2,824,228 | Carmichael | Feb. 18, 1958 |

FOREIGN PATENTS

| | | |
|---|---|---|
| 745,908 | Great Britain | Mar. 7 1956 |

UNITED STATES PATENT OFFICE

CERTIFICATION OF CORRECTION

Patent No. 2,920,289 January 5, 1960

Maurice A. Meyer

It is hereby certified that error appears in the above numbered patent requiring correction and that the said Letters Patent should read as corrected below.

Column 7, lines 74 and 75, for "$\frac{10^7}{2.10^4}$" read -- $\frac{10^7}{2\cdot 10^4}$ --; column 8, line 33, for "$f_o+f_m$" read -- $f_o+2f_m$ --.

Signed and sealed this 25th day of April 1961.

(SEAL)
Attest:

ERNEST W. SWIDER
Attesting Officer

DAVID L. LADD
Commissioner of Patents